July 7, 1970          KENICHI YAMAMOTO          3,519,373

ROTARY PISTON INTERNAL COMBUSTION ENGINE

Original Filed Oct. 18, 1967          2 Sheets-Sheet 1

KENICHI YAMAMOTO,
INVENTOR

BY *Wentworth, Lind & Ponack*
ATTORNEYS

United States Patent Office 3,519,373
Patented July 7, 1970

3,519,373
ROTARY PISTON INTERNAL COMBUSTION ENGINE
Kenichi Yamamoto, Hiroshima-shi, Japan, assignor to Toyo Kogyo Company Limited, Hiroshima-shi, Japan
Continuation of application Ser. No. 676,171, Oct. 18, 1967. This application Feb. 27, 1969, Ser. No. 809,455
Claims priority, application Japan, Oct. 18, 1966, 41/97,102; Nov. 9, 1966, 41/73,641
Int. Cl. F02b 53/00
U.S. Cl. 418—61    7 Claims

ABSTRACT OF THE DISCLOSURE

A combustion product exhaust means for a rotary piston internal combustion engine having an exhaust port in the end wall or in the end wall and the annual center wall where the exhausting pressure is lowered by gradually developing the exhausting opening or simultaneously and/or periodically controlling at least two-way exhausting by the action of the planetary motion of the rotary piston.

---

This application is a continuation of Ser. No. 676,171, filed Oct. 18, 1967, now abandoned.

This invention relates to rotary piston internal combustion engines and more particularly to a novel exhaust means which improves the exhausting characteristic of the combustion products of the engine.

In the rotary piston internal combustion engine, in which the intake, compression power and exhaust strokes are performed by means of planetary motions of a rotary piston within a housing, the timing of the starting of the opening and the timing of the termination of the closing of the exhaust port considerably affect the performance of the engine, and due to the specific structure of the said rotary piston engine, the exhaust port thereof is required to have characteristic of retarded opening and early closing, that is, for the sake of improvement of the engine performance, the retarded opening of the exhaust port is required for the effective utilization of the expansion energy of the combustion gas in the working chamber and, the early closing of the exhaust port is on the other hand required for minimizing the overlap of the intake and the exhaust.

The retarded opening and the early closing of the exhaust port, however, introduces an inconvenience of insufficient port opening dimension for the exhaust, and wherein since the opening for the perfect exhaust is impossible the remaining combustion products are carried into the next intake stroke chamber whereby the efficiency of the intake of the gas mixture is considerably deteriorated.

In view of the foregoing characteristic in the exhaust of the rotary piston engine, the exhaust port is therefore required to open and close with the most suited timing for the good engine performance, and the opening dimension thereof must be maintained at the range within which the combustion products can be perfectly exhausted from the working chamber. Under the restriction or requirement hereinabove described, the exhaust port yet must have the feature by which the maximum exhaust opening dimension can be obtained so that the insufficient exhaust is eliminated as far as possible. That is, when the exhaust port is provided in the center or the annular wall of the housing, the port opening to the chamber shall have a square outline feature defined by the side wall being disposed at right angles to the initial opening edge and the terminal edge thereof, both of the latter being parallel to the lengthwise direction of the apex seals, so that the port can instantly obtain the maximum opening dimension by the action of the planetary motion of the piston whereby the apex seal, parallel to the axis of the piston and on each of the apices of the rotary piston, passes over the said square exhaust port opening. If an exhaust port is also provided in the end or the side wall of the housing, the port opening to the chamber for the exhaust must have the feature so that the radial outer edge of the port substantially runs along the path drawn by such a plurality of the corner seals which combine one end of each of a plurality of side seal and one axial end of the apex seal at an end face of the piston, and the radial inner end or the edge of the said port runs along the path drawn by an annual oil seal disposed radially inwardly and spaced from the said side seal on each end face of the rotary piston, so that thereby as large an exhaust opening as possible can be obtained through the port provided in the side wall.

Due to the specific structure or feature of the exhaust port in the center or annual casing of the housing, the resistance of the flowing of the exhaust is less than that through the exhaust port in the side or the end wall, further, the opening of the exhaust port by the action of the planetary motion of the piston instantly produces the full open for the exhaust and, therefore, the combustion product can be instantly exhausted and therein the exhaust efficiency may be improved but, on the other hand, the instant development of the said exhaust port to the full open results in the abrupt change of the pressure in the said exhaust port and produces the high-frequency explosive. Therefore, concerning the excessive explosive noise and overcoming of same, then by having concerns the exhaust port provided in the end or the side wall is considered more desirable or advantageous for the engine performance than if provided in the annular center wall.

When the exhaust port is provided in the side or end wall however, the feature of the initial edge of the exhaust opening must correspond with the radial outer end of the side seal on the end face of the rotary piston so that the passing of the said side seal over the initial edge of the exhaust opening with the planetary motion of the rotary piston produces larger exhaust opening as much as possible in order to obtain the maximum exhaust. This means that the exhaust, for the most part thereof, is carried out at the initial opening period since due to the already described specific restriction in respect of the feature of this exhaust port opening to the working chamber, that is, the port opening dimension is the largest at the initial opening and is gradually decreased towards the terminal edge of the port, the greater part of the exhaust is instantly carried out at the initial exhaust, thereby the abrupt change of the pressure in the exhaust port and accordingly the defect of the high-frequency explosive noise are likewise unavoidable although the exhaust port is provided in the end or the side wall.

It is therefore an object of the present invention to provide a rotary piston internal combustion engine of the character hereinabove described in which the defect of the exhausting characteristic before described is eliminated.

Another object of the present invention is to provide a combustion product exhausting means for a rotary piston internal combustion engine in which the exhausting pressure is lowered by gradually developing the exhausting opening by the action of the planetary motion of the rotary piston.

A further object of the invention is to provide a combustion product exhausting means in which the exhausting is carried out with a lower exhaust pressure by exhausting through a combination of at least a pair of the exhaust ports with one in the annular or center wall and one in the side or the end wall.

Another object of the invention is to provide a combustion product exhausting means for a rotary piston internal combustion engine in which the initial opening edge of the exhaust port in the end or the side wall opens earlier than that of the port in the annular or center wall so as to lower the exhausting pressure.

A further object of the invention is to provide a combustion product exhausting means for a rotary piston internal combustion engine having only a side-wall-located exhaust port as per the following FIG. 4 description of the drawing figures, in which the initial opening edge of the exhaust port as disposed in the end or side wall is crossed by the radial outer end or edge of the side seal strips on the end face of the rotary piston, said strips making contact with the pointed edge or corner of the opening, when the said piston rotates so that the gradual development of the exhaust port opening is evolved and thereby eliminates the abrupt change of the pressure in the port.

Another and further objects and advantages of the invention will become apparent from the following detailed description and accompanying drawings wherein.

Figure 1:
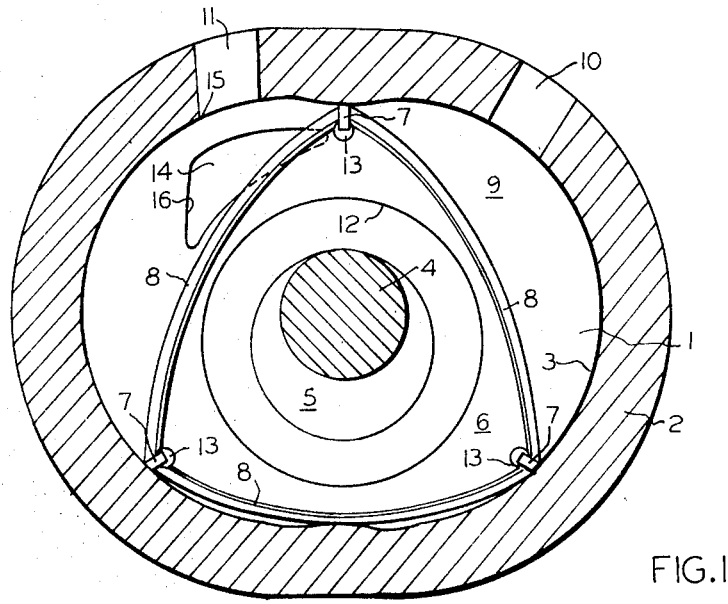
FIG. 1 is a side elevation of the mechanism with one end wall of the engine housing removed to show the rotary piston position therein.

As shown in the figures the rotary piston internal combustion engine comprises a housing composed of axially spaced end walls 1 having substantially flat inner faces, and an annular center wall 2 disposed between and interconnecting said end walls to form a cavity therebetween. The inner surface 3 of the annular center wall 2 preferably has a multi-lobed cross-sectional profile which is basically an epitrochoid. A shaft 4 extends coaxially of the cavity defined by the housing and is journaled in bearings in the walls 1. Eccentrically disposed in the housing and journaled on an eccentric portion 5 of the shaft 4 is a rotary piston 6 having a plurality of circumferentially-spaced apex portions around its outer periphery. Each of said apex portions has radially movable apex seal means 7 which are in continuous sealing engagement with the center wall inner surface 3. The opposite ends or sidewalls of the rotary piston are substantially flat faces having side seal strips 8 extending between pairs of apex seals 7, and the side seal strips 8 sealingly engage the end walls 1 thereby forming, together with the apex seals 7, a plurality of working chambers 9 which vary in volume when the rotary piston 7 rotates within and relative to the housing. An intake portion 10 is provided in the center wall 2 for admitting gas mixture. An ignition means (not shown) may be provided for igniting the mixture and an exhaust port 11 circumferentially spaced from the intake port 10 is provided in the center wall 2 for exhausting the combustion product so that the strokes of intake, compression, expansion and exhaust may be carried out. Radially inwardly spaced from the side seal strips 8 is an oil seal ring 12 and provided adjacent each apex of the piston 6 are corner seals 13 adapted for combining each end of the side seal strips 8 together with an axial end of the apex seal 7 for sealing engagement with the adjacent end wall inner face.

Adjacent the exhaust port 11 and provided in the end wall 1 is an additional exhaust port 14 which cooperates in exhaust function with the exhaust port 11 as hereinafter described.

The rotary piston 6 rotates in the direction as shown with arrow in each drawing and the strokes of intake, compression, power, expansion and exhaust are thereby performed. When the expansion strokes comes to final and the apex portion of the piston 6 passes over the exhaust port portion, that is, when the apex seal 7 moves past the initial opening edge 15 of the exhaust port 11, the exhaust through the port 11 starts. At the same time, the exhaust starts also through the port 14 when the side seal strip 8 passes over the initial opening edge 16 of the exhaust port 14 and thereby the simultaneous exhaust through the ports 11 and 14 improves the exhausting efficiency and the combustion products are perfectly expelled until the next trailing apex portion passes over each exhaust port 11 and 14. According to the present invention, the absolute dimension of the exhaust port opening which is restricted by the hereinbefore mentioned opening and closing timing of the port, and the side and the oil seal positioning and/or feature thereof, are enlarged without infringement of the required retarded opening and the early closing characteristic, and although the exhaust is instantly performed, the abrupt change of the pressure in the exhaust port is prevented and accordingly the exhaust silencing effect is also improved.

Figure 3:
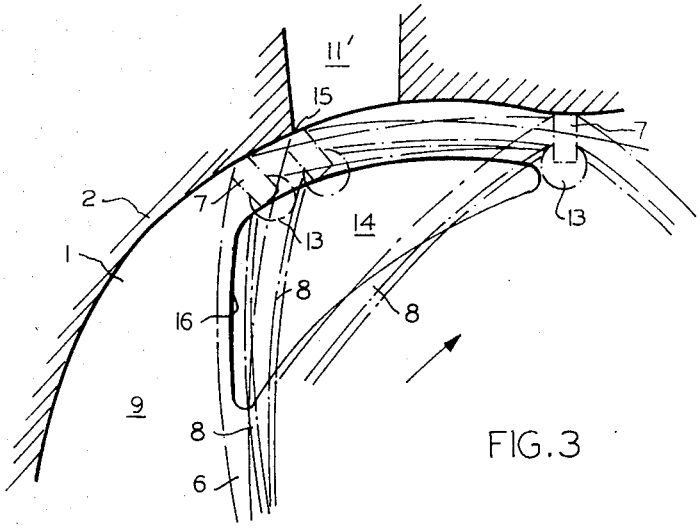
FIG. 3 is a fragmentary view showing a modification of the positioning of the exhaust ports.

FIG. 3 shows a modification of the invention wherein the initial opening edge 16 of the exhaust port 14 is displaced slightly ahead of the initial opening edge 15 of exhaust port 11, or towards the trailing apex portion in the exhaust stroke, wherein the exhaust port 14 starts the exhaust somewhat earlier than that of the exhaust port 11 so that thereby the exhaust is initially started through only the initial opening port of the exhaust port 14 thereby the pressure of the products to be exhausted is somewhat lowered and then continuing with rotation of the piston 6 the exhaust port 11 is exposed or subjected to exhausting together with the port 14, wherein the combustion gases are expelled from both ports, with the attendant advantage that due to the abrupt change of the pressure in the exhaust ports being eliminated, then the high-frequency explosive noise of the exhausting is avoided.

Figure 4:
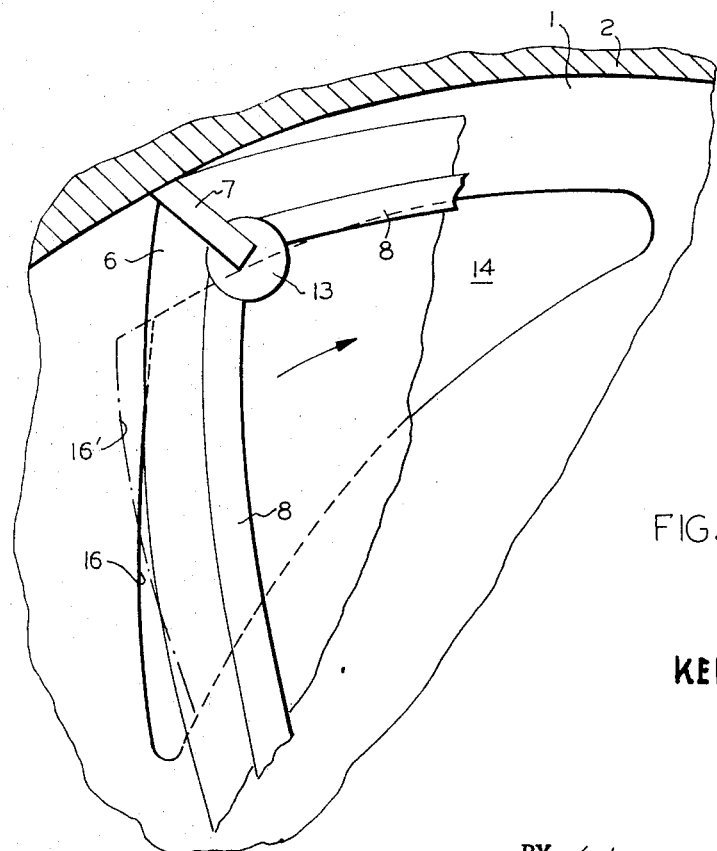
FIG. 4 is a fragmentary view similar to FIG. 3 but therein having the exhaust port only in the end wall.
Figure 2:
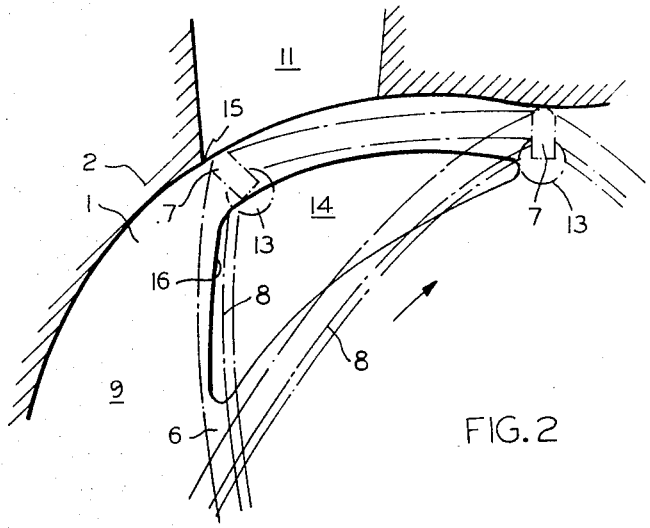
FIG. 2 is a fragmentary view showing the position and feature of each exhaust port in the center wall and the end wall.

The said abrupt change of the pressure in the exhaust port also may be eliminated by the relative dispositor, as shown in FIG. 4, so that the radial outer end or edge of the side seal strip 8 crosses at the exhaust opening starting with the initial point or corner opening edge 16 of the exhaust port 14 wherein the exhaust opening to the port 14 is progressively enlarged as it is gradually opened, thereby the high-frequency explosive noise is likewise avoided. The exhausting characteristic in this modification may be variously changed by modifying the positioning or feature of the initial opening edge 16 to the desired form, for instance, as shown with dot-dash line and indicated by reference numeral 16' in FIG. 4.

What I claim:

1. A rotary piston internal combustion engine comprising in combination:
   (a) a casing having two laterally spaced parallel side walls interconnected circumferentially by a generally annular center wall having at least a two-lobed internal surface;
   (b) rotary piston means including
      (1) a piston of polygonal shape having circumferentially spaced apices which form a plurality of working chambers within said casing and perform intake, compression, explosion-expansion, and exhaust processes of working fluid as the piston planetarily rotates with the apices contacting the internal circumferential surface;
      (2) sealing means on said piston to establish apex and side wall sealing of the piston with the internal surface of said casing, and
   (c) fluid exhaust means including a pair of generally adjacently disposed exhaust ports with one port being disposed in the annular center wall and the other port disposed in the side wall of the casing said ports being disposed relative to each other and to the rotary path of the piston whereby the exhaust port in the side wall is opened in advance of the opening of the exhaust port in said annular center wall, to impart quieter, increased operating efficiency to the engine.

2. A rotary piston engine as defined in claim 1, wherein the disposition of said ports in paragraph (c) thereof are slightly altered so that at least portions of each of said ports are opened concurrently to initiate the simultaneous expelling of exhaust fluid.

3. A rotary piston engine as defined in claim 1, wherein the rotary piston means further includes
    (a) a crankshaft rotatably mounted through said side walls, and having an eccentric portion positioned generally centrally within said casing;
    (b) said rotary piston being rotatably mounted on said eccentric portion within the casing;
    (c) said piston having at least three circumferentially spaced apices; and
    (d) piston seal means on said piston including
        (1) apex seals on each of the apices to engage with the internal surface of the circumferential center wall, and
        (2) side sealing strips extending between each pair of the apex seals for sealing engagement with the inner face of adjacent side walls.

4. A rotary piston internal combustion engine comprising in combination:
    (a) a casing having two laterally spaced parallel side walls interconnected circumferentially by a generally annular center wall having at least a two-lobed internal surface;
    (b) rotary piston means including:
        (1) a piston of polygonal shape having circumferentially spaced apices which form a plurality of working chambers within said casing and perform intake, compression, explosion-expansion, an exhaust processes of working fluid as the piston planetarily rotates with the apices contacting the internal circumferential surface;
        (2) sealing means on said piston including apex seals on each of the apices to engage with the internal surface of the circumferential center wall, and side sealing strips extending between each pair of the apex seals for sealing engagement with the inner face of adjacent side walls;
    (c) fluid exhaust means including an exhaust port in said side wall having an initial opening edge; and
    (d) said initial opening edge being inclined at an angle to a radal outer edge of said side sealing strip when said exhaust port starts to open so that said latter radial outer edge crosses with said initial opening edge of said exhaust port at an angle, as said rotary piston rotates, whereby the exhaust opening to said port is gradually enlarged and thereby the explosive noise is reduced.

5. A rotary piston internal combustion engine as defined in claim 4 wherein the exhaust port means further comprises
    (e) another exhaust port disposed in the annular center wall and generally adjacent to the other exhaust port in the side wall; and
    (f) said ports disposed relative to each other and the rotary path of the piston whereby at least portions of each of said ports are opened concurrently to simultaneously expel exhaust fluid from the casing, thereby imparting added efficiency and reduced noise level characteristics to the engine.

6. A rotary piston, internal combustion engine as defined in claim 4 wherein the exhaust port means further comprises
    (e) another exhaust outlet port disposed through the annular center wall and generally adjacent to the other exhaust port in the side wall; and
    (f) said ports disposed relative to each other and to the rotary path of the piston whereby the exhaust port in the side wall is opened in advance of the exhaust port in the annular center wall of the casing.

7. A rotary piston internal combustion engine as defined in claim 4 wherein the rotary piston means thereof further includes
    (e) a crankshaft rotatably mounted through said side wall, and having an eccentric portion positioned generally centrally within said casing;
    (f) said rotary piston being rotatably mounted on said eccentric portion within the casing;
    (g) said exhaust means include another exhaust port disposed through the annular center wall and generally adjacent to the first-mentioned exhaust port in the side wall; and
    (h) said exhaust ports each having initial opening edges which are so related to each other and the rotational direction of the piston whereby the exhaust port in the side wall is opened in advance of the exhaust port in the annular center wall, to impart quieter, increased operating efficiency to the engine.

References Cited

UNITED STATES PATENTS

| | | | |
|---|---|---|---|
| 2,947,290 | 8/1960 | Froede | 123—8 |
| 3,103,208 | 9/1963 | Price | 123—8 |

MARK M. NEWMAN, Primary Examiner

D. HART, Assistant Examiner

U.S. Cl. X.R.

418—112